(12) United States Patent
Zink et al.

(10) Patent No.: US 10,789,495 B2
(45) Date of Patent: Sep. 29, 2020

(54) SYSTEM AND METHOD FOR 1D ROOT ASSOCIATION PROVIDING SPARSITY GUARANTEE IN IMAGE DATA

(71) Applicants: VOLKSWAGEN AG, Wolfsburg (DE); AUDI AG, Ingolstadt (DE); PORSCHE AG, Stuttgart (DE)

(72) Inventors: Edmund Dawes Zink, McKinney, TX (US); Douglas Allen Hauger, San Francisco, CA (US); Jerramy L. Gipson, Willits, CA (US); Allen Khorasani, San Mateo, CA (US); Lutz Junge, San Mateo, CA (US); Nils Kuepper, Millbrae, CA (US); Andreas Busse, Mountain View, CA (US); Nikhil J. George, Palo Alto, CA (US)

(73) Assignees: Volkswagen AG (DE); Audi AG (DE); Porsche AG (DE)

( * ) Notice: Subject to any disclaimer, the term of this patent is extended or adjusted under 35 U.S.C. 154(b) by 112 days.

(21) Appl. No.: 15/674,990

(22) Filed: Aug. 11, 2017

(65) Prior Publication Data
US 2018/0173982 A1    Jun. 21, 2018

Related U.S. Application Data

(63) Continuation-in-part of application No. 15/386,220, filed on Dec. 21, 2016, now Pat. No. 10,133,944.

(51) Int. Cl.
| | | |
|---|---|---|
| G06K 9/00 | (2006.01) |
| G05D 1/02 | (2020.01) |
| G06T 7/246 | (2017.01) |
| B60W 30/00 | (2006.01) |
| G06T 7/13 | (2017.01) |
| G06K 9/48 | (2006.01) |

(Continued)

(52) U.S. Cl.
CPC ......... G06K 9/00973 (2013.01); B60W 30/00 (2013.01); G05D 1/0246 (2013.01); G06K 9/00791 (2013.01); G06T 7/13 (2017.01); G06T 7/248 (2017.01); G06K 9/4609 (2013.01); G06K 9/4638 (2013.01); G06K 9/4661 (2013.01); G06K 9/481 (2013.01); G06T 7/215 (2017.01); G06T 2207/20081 (2013.01); G06T 2207/30252 (2013.01)

(58) Field of Classification Search
None
See application file for complete search history.

(56) References Cited

U.S. PATENT DOCUMENTS

| | | | |
|---|---|---|---|
| 5,790,690 A | * | 8/1998 | Doi ........................ G06T 7/0012 382/128 |
| 6,020,953 A | | 2/2000 | Barrows |

(Continued)

OTHER PUBLICATIONS

Sabzmeydani, P. et al., "Detecting Pedestrians by Learning Shapelet Features", 2007, 2007 IEEE Conference on Computer Vision and Pattern Recognition, p. 1-8. (Year: 2007).*

(Continued)

*Primary Examiner* — Gandhi Thirugnanam
(74) *Attorney, Agent, or Firm* — Barnes & Thornburg LLP

(57) ABSTRACT

A system and methodologies for neuromorphic (NM) vision simulate conventional analog NM system functionality and generate digital NM image data that facilitate improved object detection, classification, and tracking.

23 Claims, 8 Drawing Sheets

(51) Int. Cl.
*G06T 7/215* (2017.01)
*G06K 9/46* (2006.01)

(56) References Cited

U.S. PATENT DOCUMENTS

| | | | |
|---|---|---|---|
| 6,023,521 | A | 2/2000 | Sarpeshkar et al. |
| 6,212,289 | B1 | 4/2001 | Sarpeshkar et al. |
| 6,384,905 | B1 | 5/2002 | Barrows |
| 6,665,439 | B1* | 12/2003 | Takahashi ............ G06K 9/0063 382/165 |
| 6,718,062 | B1* | 4/2004 | Zhang ...................... G06K 9/32 382/154 |
| 7,388,988 | B2 | 6/2008 | Luo |
| 7,659,967 | B2 | 2/2010 | Barrows et al. |
| 7,925,051 | B2 | 4/2011 | Gensolen et al. |
| 8,098,886 | B2 | 1/2012 | Koch et al. |
| 8,116,581 | B2* | 2/2012 | Sun ......................... H04N 1/41 348/14.13 |
| 8,332,340 | B2 | 12/2012 | Snider |
| 8,396,297 | B2* | 3/2013 | Panda ....................... G06T 7/13 382/199 |
| 8,401,297 | B1 | 3/2013 | Apostolos et al. |
| 8,694,449 | B2 | 4/2014 | Weng et al. |
| 8,780,240 | B2 | 7/2014 | Posch et al. |
| 8,930,291 | B1 | 1/2015 | Srinivasa et al. |
| 8,959,040 | B1 | 2/2015 | Cruz-Albrecht et al. |
| 9,014,416 | B1 | 4/2015 | Fisher et al. |
| 9,047,568 | B1 | 6/2015 | Fisher et al. |
| 9,070,039 | B2 | 6/2015 | Richert |
| 9,098,811 | B2 | 8/2015 | Petre et al. |
| 9,111,215 | B2 | 8/2015 | Piekniewski |
| 9,111,226 | B2 | 8/2015 | Richert |
| 9,123,127 | B2 | 9/2015 | Richert |
| 9,129,221 | B2 | 9/2015 | Piekniewski et al. |
| 9,152,915 | B1 | 10/2015 | Gabardos et al. |
| 9,183,493 | B2 | 11/2015 | Richert et al. |
| 9,186,793 | B1 | 11/2015 | Meier |
| 9,195,903 | B2 | 11/2015 | Andreopoulos et al. |
| 9,195,934 | B1 | 11/2015 | Hunt et al. |
| 10,133,944 | B2 | 11/2018 | Zink et al. |
| 10,229,341 | B2 | 3/2019 | Zink et al. |
| 10,235,565 | B2 | 3/2019 | Zink et al. |
| 2003/0118245 | A1* | 6/2003 | Yaroslavsky ......... G06T 7/0002 382/255 |
| 2004/0096106 | A1* | 5/2004 | Demi ...................... G06T 7/13 382/199 |
| 2009/0262247 | A1 | 10/2009 | Huang et al. |
| 2011/0222779 | A1* | 9/2011 | Karanam ................. G06T 7/13 382/199 |
| 2011/0286671 | A1* | 11/2011 | Xu .......................... G06T 7/13 382/199 |
| 2013/0251209 | A1 | 9/2013 | Kim |
| 2014/0064609 | A1 | 3/2014 | Petre et al. |
| 2014/0229411 | A1 | 8/2014 | Richert et al. |
| 2014/0258195 | A1 | 9/2014 | Weng et al. |
| 2015/0161505 | A1 | 6/2015 | Sugioka |
| 2018/0173934 | A1* | 6/2018 | Zink ...................... H04N 5/232 |
| 2018/0173954 | A1* | 6/2018 | Zink .................... G06K 9/4671 |
| 2018/0173982 | A1* | 6/2018 | Zink .................. G06K 9/00973 |
| 2018/0173983 | A1* | 6/2018 | Zink .................. G06K 9/00986 |
| 2018/0173992 | A1* | 6/2018 | Zink ......................... G06T 1/20 |
| 2018/0207423 | A1* | 7/2018 | Benosman ......... A61N 1/36046 |
| 2018/0249093 | A1 | 8/2018 | Saeki et al. |
| 2019/0017811 | A1 | 1/2019 | Watanabe et al. |
| 2019/0116322 | A1 | 4/2019 | Holzer et al. |
| 2019/0213388 | A1 | 7/2019 | Makeev et al. |

OTHER PUBLICATIONS

Kovesi, P. (2005). Shapelets correlated with surface normals produce surfaces. Proceedings of the IEEE International Conference on Computer Vision. 2. 994-1001 vol. 2. 10.1109/ICCV.2005.224. (Year: 2005).*

Garcia et al.; pyDVS: An Extensible, Real-time Dynamic Vision Sensor Emulator using Off-the-Shelf Hardware; 2016 IEEE Symposium Series on Computational Intelligence (SSCI); Dec. 6, 2016; pp. 1-7.

Kuhn; Fast MPEG-4 Motion Estimation: Processor Based and Flexible VLSI Implementations; Journal of VLSI Signal Processing Systems for Signal, Image, and Video Technology; Oct. 1, 1999; vol. 23, No. 1; pp. 67-92.

Mueggler et al.; Lifetime Estimation of Events from Dynamic Vision Sensors; 2015 IEEE International Conference on Robotics and Automation (ICRA); IEEE; May 26, 2015; pp. 4874-4881.

Rueckauer et al.; Evaluation of Event-Based Algorithms for Optical Flow with Ground-Truth from Inertial Measurement Sensor; Frontiers in Neuroscience; Apr. 25, 2016; vol. 10, Article 176.

Tschechne et al.; Bio-Inspired Optic Flow from Event-Based Neuromorphic Sensor Input; ECCV 2016 Conference; Oct. 6, 2014; pp. 171-182.

Search Report and Written Opinion for International Patent Application No. PCT/EP2017/083411; dated Mar. 21, 2018.

Floreano et al.; Miniature curved artificial compound eyes; PNAS; Jun. 4, 2013; pp. 9267-9272; vol. 110, No. 23.

Tsang et al.; Neuromorphic Implementation of Active Gaze and Vergence Control; Department of Electronic and Computer Engineering, Hong Kong University of Science and Technology; 2008; pp. 1076-1079.

Brändli; Event-Based Machine Vision; Doctoral Thesis; 2015.

* cited by examiner

SYSTEM AND METHOD FOR 1D ROOT ASSOCIATION PROVIDING SPARSITY GUARANTEE IN IMAGE DATA

CROSS-REFERENCE TO RELATED APPLICATIONS

This application is a continuation-in-part, and claims priority to and the benefit, of the prior filed non-provisional U.S. patent application Ser. No. 15/386,220, filed Dec. 21, 2016, the contents of which are incorporated herein by reference in their entirety, and at least including those portions directed to neuromorphic image data collection and use.

COPYRIGHT

One or more portions of the disclosure, alone and/or in combination, of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

The present disclosure relates to systems, components, and methodologies for image processing. In particular, the present disclosure relates to systems, components, and methodologies that perform image processing and sparsity guarantee using digital NeuroMorphic (NM) vision techniques.

SUMMARY

According to the present disclosure, systems, components, and methodologies are provided for NM-based image data generation, image data processing and subsequent use to detect and/or identify objects and object movement in such image data for assistance, automation, control and/or documentation.

In accordance with disclosed embodiments, structure and software are provided for simulation of conventional analog NM system functionality using a digital NM vision system that incorporates at least one detector that includes one or more NM sensors, a digital retina implemented using, for example, CMOS technology that enables generation of digital NM data for image data processing by a digital NM engine that facilitates improved object detection, classification, and tracking. As such, exemplary embodiments are directed to structure and software that may simulate analog NM system functionality.

In accordance with at least one embodiment, the digital NM engine may include a combination of one or more detectors and one or more processors running software on back-end to generate digital NM output.

In accordance with at least one embodiment, the digital NM vision system, its components and utilized methodologies may be used to compress high framerate video data by performing feature extraction close to an imaging sensor to generate an encoded version of image data that includes differences and surrounding spatio-temporal regions for subsequent image processing. Thus, in accordance with at least one embodiment, the hardware and methodologies may be utilized as an effective method for compressing high framerate video, e.g., by analyzing image data to compress the data by capturing differences between a current frame and a one or more previous frames and applying a transformation.

In accordance with at least one embodiment, the digital NM vision system and/or at least a subset of its components may be incorporated in a stereo neuromorphic pair. In accordance with at least one implementation, components of the digital NM vision system may be incorporated in a compound camera. In such an implementation, the computational element of each imaging sensor may be coupled to other computational elements of other imaging sensors, e.g., adjacent sensors or other types of sensors, to collaborate with other computational elements to provide functionality. For example, in accordance with at least one implementation, the digital NM vision system components may be incorporated in an event-based camera.

Additional features of the present disclosure will become apparent to those skilled in the art upon consideration of illustrative embodiments exemplifying the best mode of carrying out the disclosure as presently perceived.

BRIEF DESCRIPTION OF FIGURES

The detailed description particularly refers to the accompanying figures in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Within NeuroMorphic (NM) data, associating roots enables tracking of an object within collected image data. This is because the roots are part of the same object included in the image data. Therefore, by associating the roots across time, one is able to determine a velocity for a point on an object. More specifically, velocity may be determined by performing analysis of image data to identify associated roots along a single orientation over time f(t). Since the roots are part of the same object, associating them across time may result in the determination of a velocity for a point on an object as a function of time. This root association may be performed effectively, even using one dimensional-monocular root association of data. However, to effectively perform such root association, one must determine required sparsity guarantee. The sparsity guarantee is a measure of the probability of correctly assigning each detected motion signal to the corresponding object generating that motion signal. Achieving the sparsity guarantee may be difficult or impossible for cases where the motion signal is not consistent across time and/or with lower frame rates of image collection where detected motion smears between moving objects.

More specifically, processors and software described herein can reduce in amount of data necessary to track objects in image data with associated reductions in computational cost, processor requirements and increased processing speed. These improvements that enable real-time or near-real-time sensing, detection, identification, and tracking of objects.

Figure 1:
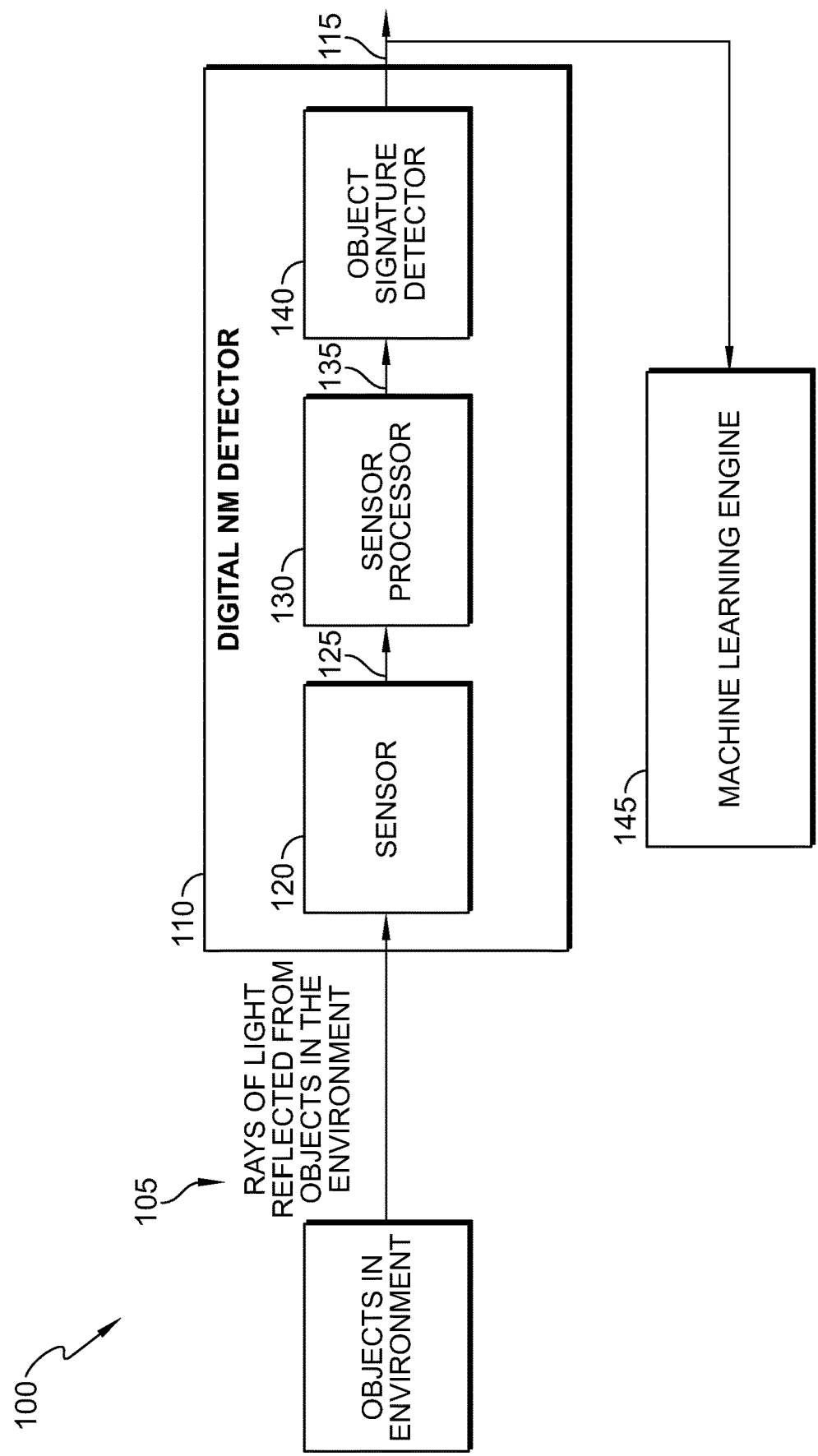
FIG. 1 is an illustrative diagram of hardware structure and software utilized by disclosed embodiments to provide simulation of conventional, human eye, analog NM system functionality including generating shapelet data from image data to assist in defining objects.

In illustrative embodiments, an example of which being illustrated in FIG. 1, structure and software are provided for a NM system 100. The NM system 100 is illustratively embodied as a digital NM system including a digital NM detector 110 for detecting images and performing at least certain portions of object recognition operations as discussed herein. The NM detector 110 illustratively includes one or more sensors 120, embodied to include at least one photoreceptor, for receiving light 105 from an object 115 with the field of the view of the sensor 120 and converting the light 105 into image data 125.

Sensor 120 may output the image data 125 into one or more sensor processors 130, e.g., one or more digital retinas, that converts that image data into shapelet data that may include intensity data and data derived or derivable from such intensity data, including "spikes," "roots", "blobs" and associated data using image processing and data processing techniques explained herein. More specifically, in at least one embodiment, the sensor processor 130 includes digital circuitry that generates spike data indicative of a spike in association with a particular photoreceptor within the sensor 120 whenever the intensity value measured by that photo receptor exceeds a threshold.

As shown in FIG. 1, the sensor processor 130 may include a digital retina for providing shapelet data 135 based on the image data 125, and an object signature detector 140 for extracting features of the object 115 from the shapelet data 135. As discussed in additional detail below, shapelet data 135 illustratively includes image data economized for vision processing. The digital retina 130 may be illustratively embodied as a sensor processor implemented, for example, using complementary metal-oxide-semiconductor (CMOS) technology, e.g., one or more Field Programmable Gate Arrays (FPGAs), (GPUs) and/or functionally and/or structurally similar devices, integrated circuits, and/or associated software and/or firmware provided in, for example, Application Specific Integrated Circuits (ASICs).

Shapelet data is provided by the sensor processor 130 to the object signature detector 140 for subsequent analysis to formulate one or more object signatures 115. That object signature data and/or shapelet data may also be output a machine learning engine 145 that may or may not be located in the same location as the other components illustrated in FIG. 1.

Referring again to FIG. 1, the shapelet data 135 generated by the digital retina 130 based on the image data 125 may include the economized image data, which can include any suitable targeted economization of the image data, and may include light intensity data, and/or data derivable therefrom using image processing and data processing techniques explained herein (e.g., "spikes," "roots", "blobs" and associated data). More specifically, in at least one embodiment, the digital retina 130 illustratively includes digital circuitry that generates spike data indicative of a "spike" associated with a particular photoreceptor of the sensor 120 whenever the light intensity value measured by that particular photo receptor exceeds a threshold. In this example, the digital retina 130 generates spike data not only based on the value measured by that particular photoreceptor 120 but also in consideration of measurements of other photo receptors 120 in close proximity to the particular photoreceptor 120, for example but without limitation, one photoreceptor away. In illustrative embodiments, spike data generated in the digital retina 130 can be used to provide (i.e., define, identify, generate, and/or otherwise establish) other economized image data, for example, roots, blobs, and/or other image processing data based on the image data 125, which are all referred to collectively and individually as "shapelet data."

In accordance with disclosed embodiments, one dimensional root association may be performed, which requires generation of shapelet data 135 that may include blobs, roots and spikes along an orientation and associating the roots. In the illustrative embodiments, shapelet data 135 is generally described with reference to roots as location points of the image data 125 (but as previously mentioned, shapelet data may include an variety of economized image data). As opposed to spikes (light intensity amplitudes), roots tend to be consistent across space (multiple cameras) and time (multiple frames). Roots can be linked or associated umabiguously with each other to enable extraction of contours, or edges related to the image data and preferably related to the object 115. The extracted contours can be used to discern object motion within the field of view.

Returning to the operations performed by the sensor processor 130, the processor generates shapelet data that enables digital NM vision including spike (sparse) data, 5D (x, y, t, Vx, Vy) velocity data and other digital data. Each spike specifies its spatial location within the input image (x, y), its temporal coordinate or timestamp (t), and its optical velocity (Vx, Vy). This shapelet data enables image data processing for improved object detection, classification, and tracking, including machine and deep learning.

As such, in accordance with at least one embodiment, the digital NM detector 110 may include one or processors running software to generate digital NM output data for analysis and subsequent control of components with the environment imaged by the detector 110. Velocity data may include "velocity vectors" which are a mathematical representation of optical flow of pixels (or photoreceptors) in image data. Velocity vector data may be used to characterize or represent a velocity space, which may be thought of as the spatial and temporal representation of video data including a plurality of frames depicting movement of an object in an environment. More specifically, in velocity space, pixels having the same velocity vector may be aggregated and associated with one another to perform velocity segmentation, which enables the ability to identify and differentiate objects within the image data based on their relative motion over frames of image data. Thus, velocity vector data may be used to indicate basic features (e.g., edges) of objects included in the image data, by identifying boundaries between the edges of the objects in the image data. This data may, therefore, be used to define one or more boundaries between foreground objects and background, thus creating velocity silhouettes, or blobs. In this way, velocity silhouettes, or blobs, may define edges at the boundary between a foreground object and a background object.

Figure 2:
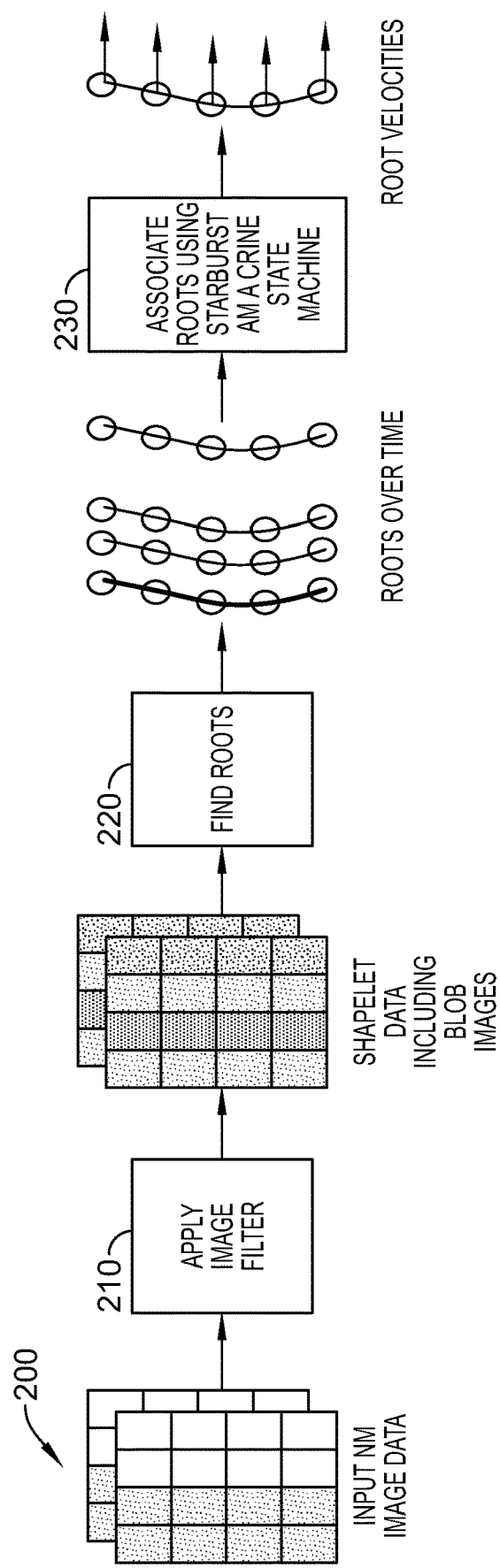
FIG. 2 is a block diagram of an illustrative arrangement of filters and/or operations use to provide the simulation of object definition from shapelet data provided in accordance with at least one embodiment.

A methodology for performing one dimensional root association is illustrated in FIG. 2. As shown in FIG. 2, input image data, e.g., NM image data is input at 200 and an image filter (described in greater detail in FIG. 3 below) is applied to the image data at 210 to generate shapelet data that may include blob images, or sparsity images. Blob images data may then be used, at 220, to identify roots for the image data. Application of the image filter produces/defines root functions and associated dead zones between them. Given the nature of the image data in video, those roots may be identified over time 225 based, at least in part, on a sparsity guarantee. This guarantees that a minimum spacing, or dead zone exists between adjacent roots in which no other roots of the image can be located. That root data over time may be used at 230 to associate roots using a Starburst Amacrine State Machine (SASM) to generate root velocities. By generating the root velocities, roots having the same velocities may be associated with one another.

Therefore, determining roots are key to enabling the sparsity guarantee. First, unlike spikes, roots are consistent across frames. Second, unlike spikes which are two-dimensional quantities that represent the area of the receptive field of a pixel, roots are dimensionless points that represent an exact place on the image. Third, similar to spikes, roots can be decluttered based on polarity. However, unlike spikes, roots can be projected into multidimensional space where each dimension corresponds to an orientation. Finally, roots spread out the points along each dimension and create dead zones creating a guaranteed minimum spacing between adjacent roots, known as a sparsity guarantee. These characteristics of roots enable movement of objects in captured image data to be determined to a high degree of accuracy. Determined roots in the image frames will have a guaranteed minimum dead zone in all directions, or dimensions. Once a root has been identified, it can be known that no root can exist within one pixel unit of that root in the dead zone. These dead zones create known minimum isolation spacing between roots that reduces confusion and noise thereby improving the ability to associate identified isolated roots across successive frames in time.

Figure 3:
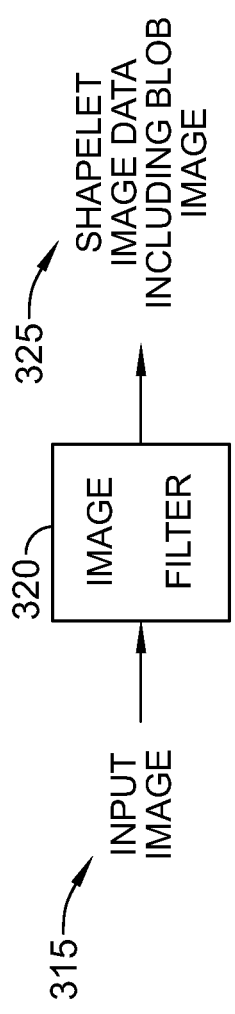
FIG. 3 is a block diagram depicting the inputs and outputs for a center-surround filter in accordance with at least one embodiment.
Figure 3:
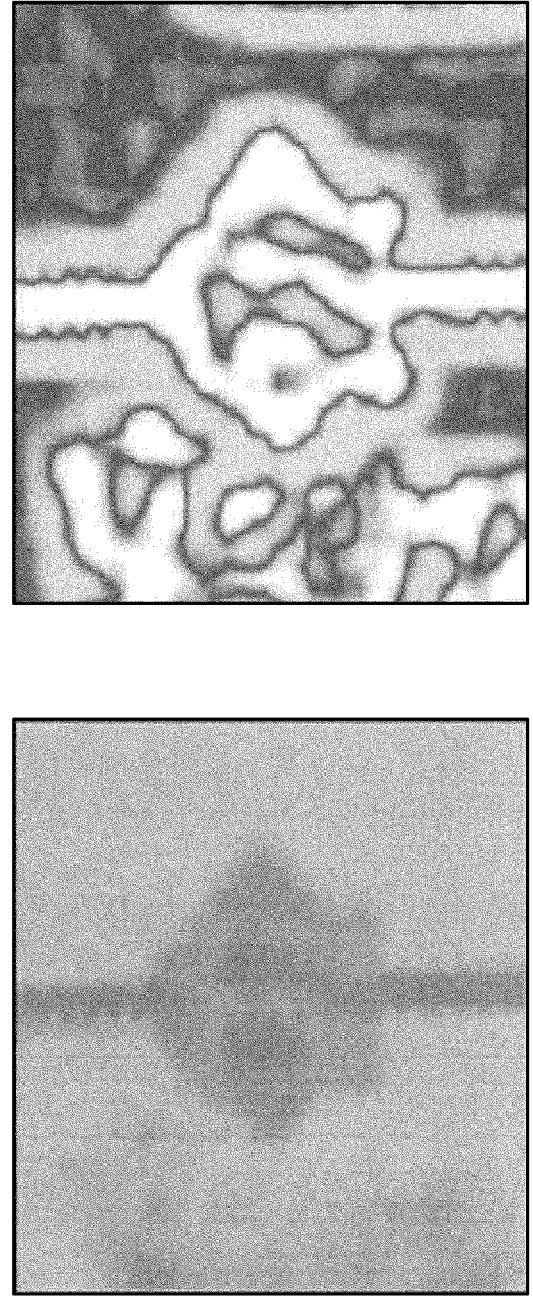
Figure 4:
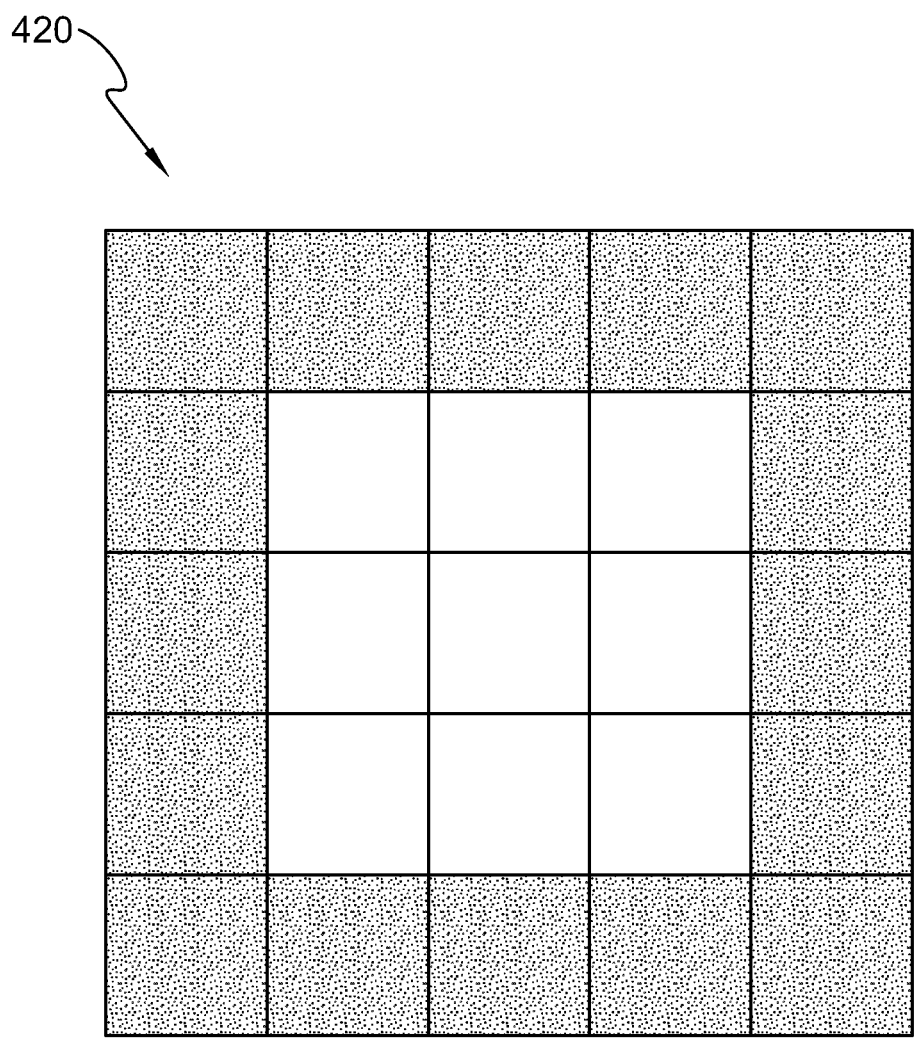
FIG. 4 is a diagram of a center-surround filter in accordance with at least one embodiment.

In accordance with disclosed embodiments, an image filter 320 may be used on input image data 315 to generate shapelet data including blob image data 325 as shown in FIG. 3. The filter 320 is specifically designed so that the resolution of the input image data 315 is equal to the resolution of the blob image data 325. In some embodiments, the filter 320 is a center surround filter similar in functionality to a center-surround ganglion cell in the human eye. As seen in FIG. 4, the center-surround filter 420 includes center pixels (white) and outer-ring pixels (black). The center surround filter functions as a center-surround kernel and computes a differential by subtracting the average of the center pixels and the average of the outer ring pixels. The convolutions of the center-surround filter 420 with the input image data 415 may be performed to generate blob image data.

In accordance with some embodiments, the center-surround filter window size may be as small as a 3×3 matrix up to and including a 64×64 matrix, dependent on the pixel resolution of the incoming image data. The filter window size is selected so that the input image resolution will equal the output blob image resolution. As a result, root identification may occur with sub-pixel accuracy. More specifically, root identification may occur at to ⅛ pixel accuracy. In other words, roots are spread out 8× more by maintaining the image resolution during image filtering to obtain the blob image.

In some embodiments, the filter 320 is a difference of Gaussian ("DOG") filter. In some embodiments, the filter 320 is a Laplacian of Gaussian filter which may be applied to approximate the DOG filter.

Figure 5:
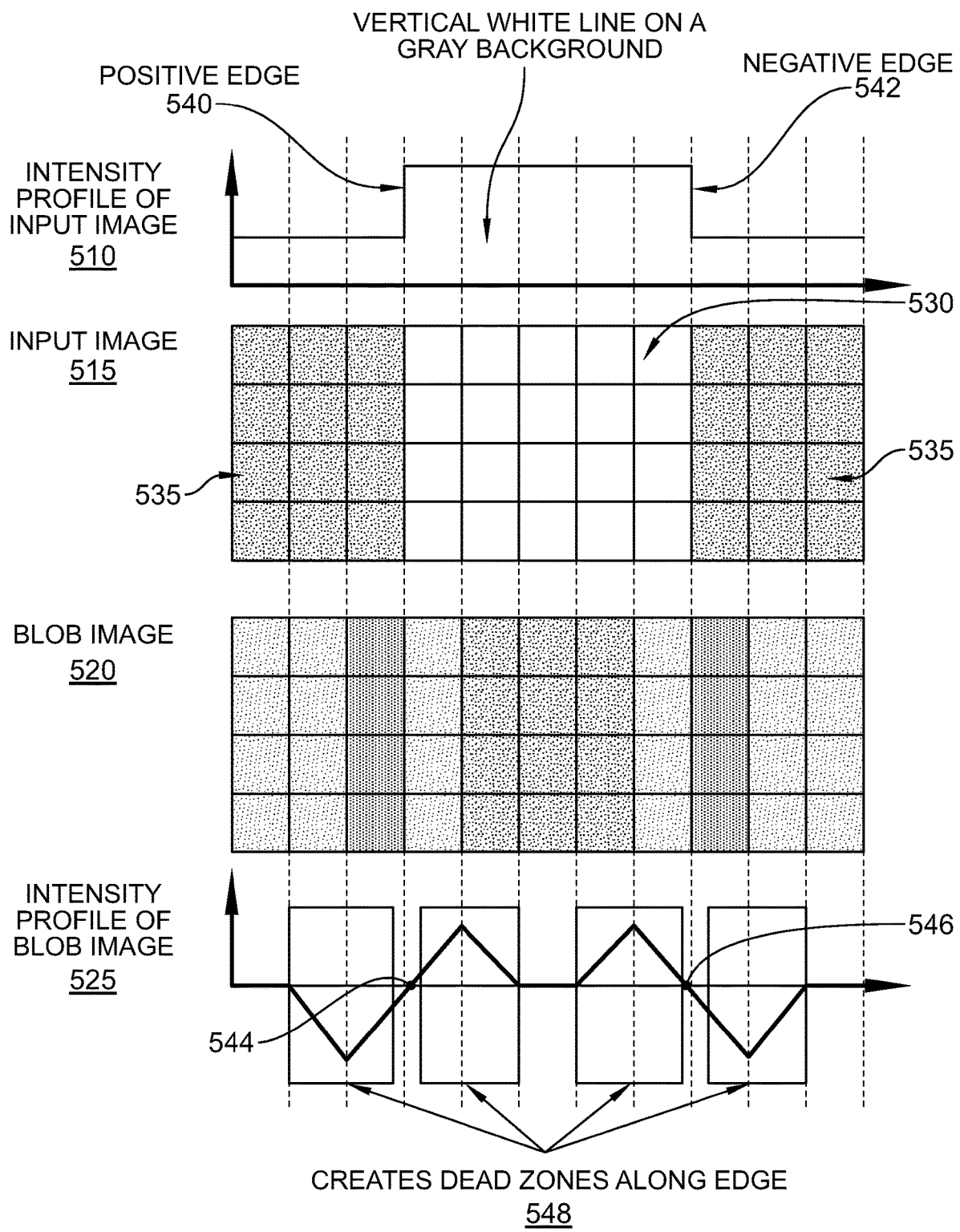
FIG. 5 is an illustrative embodiment of the intensity profile of an input image; the blob image that results from the center-surround filtering and the corresponding intensity profile of the blob image in accordance with at least one embodiment.

FIG. 5 illustrates an example of how the image filter of FIG. 3 alters the input image and the corresponding changes to the intensity profile of the input image. As illustrated in FIG. 5, the intensity profile of input image data 510 may include variations in intensity that represent objects in the scene captured by the sensor. For illustration, the intensity profile of a vertical white line 530 on a gray background 535 is shown. The vertical white line 530 in the input image 515 creates a positive edge 540 (from gray background to white line) and a negative edge 542 (from white line to gray background) The image filter convolves with the input image 515 to output the blob image 520. From left to right, the blob image intensity profile 525 dips down before the positive edge and then dips up after the positive edge, thus creating a zero-crossing 544 that corresponds to the positive edge 540 in the input image. This zero-crossing 544 along a positive slope in the intensity profile is referred to as a positive root.

Similarly, the blob image intensity profile 525 dips up before the negative edge and then dips down after the negative edge, this creating a zero-crossing 546 that corresponds to the negative edge 642 of the input image. This zero-crossing 546 along a negative slope in the intensity profile is referred to as a negative root. Mathematically, no neighboring roots may occur where the blob image dips up/down adjacent to the root as defined by the zero crossings 544, 546. These regions are referred to as dead zones 548. It should be noted, in particular, that dead zones 548 are present within the intensity profile of generated blob image data 525 such that no roots (zero crossings 544, 546) are located within the dead zones 548. Each root is separated from any other root in the blob image by a dead zone of at least one pixel.

Figure 6:
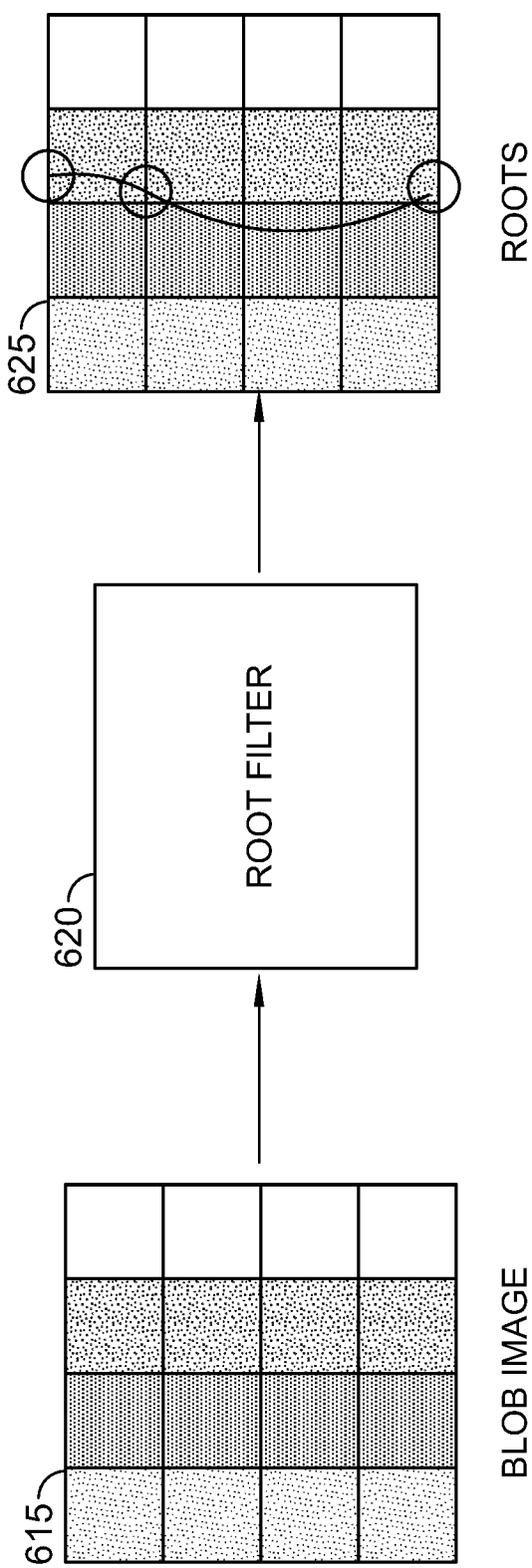
FIG. 6 is a block diagram illustrating determination of roots from the blob image in accordance with at least one embodiment.

As seen in FIG. 6, blob image data 615 may be filtered by a root filter 620 to identify roots 625, by identifying the zero-crossings, or roots, in the blob image intensity profile and their associated dead zones. In some embodiments, the root filter 620 may employ Ocular Micro-Tremor (OMT), in which a blob image data 615 is electronically vibrated along one or more orientations to compute the zero crossing sub-pixel coordinates of the blob image along orientation of the applied vibration. The root filter 620 outputs identified roots with positive or negative polarity at sub-pixel resolution, preferably ⅛ sub-pixel, with whole pixel resolution dead zone separation between the roots. In other words, each identified root at ⅛ sub-pixel resolution is separated from any other root in the image by at least 8 sub-pixels.

Figure 7:
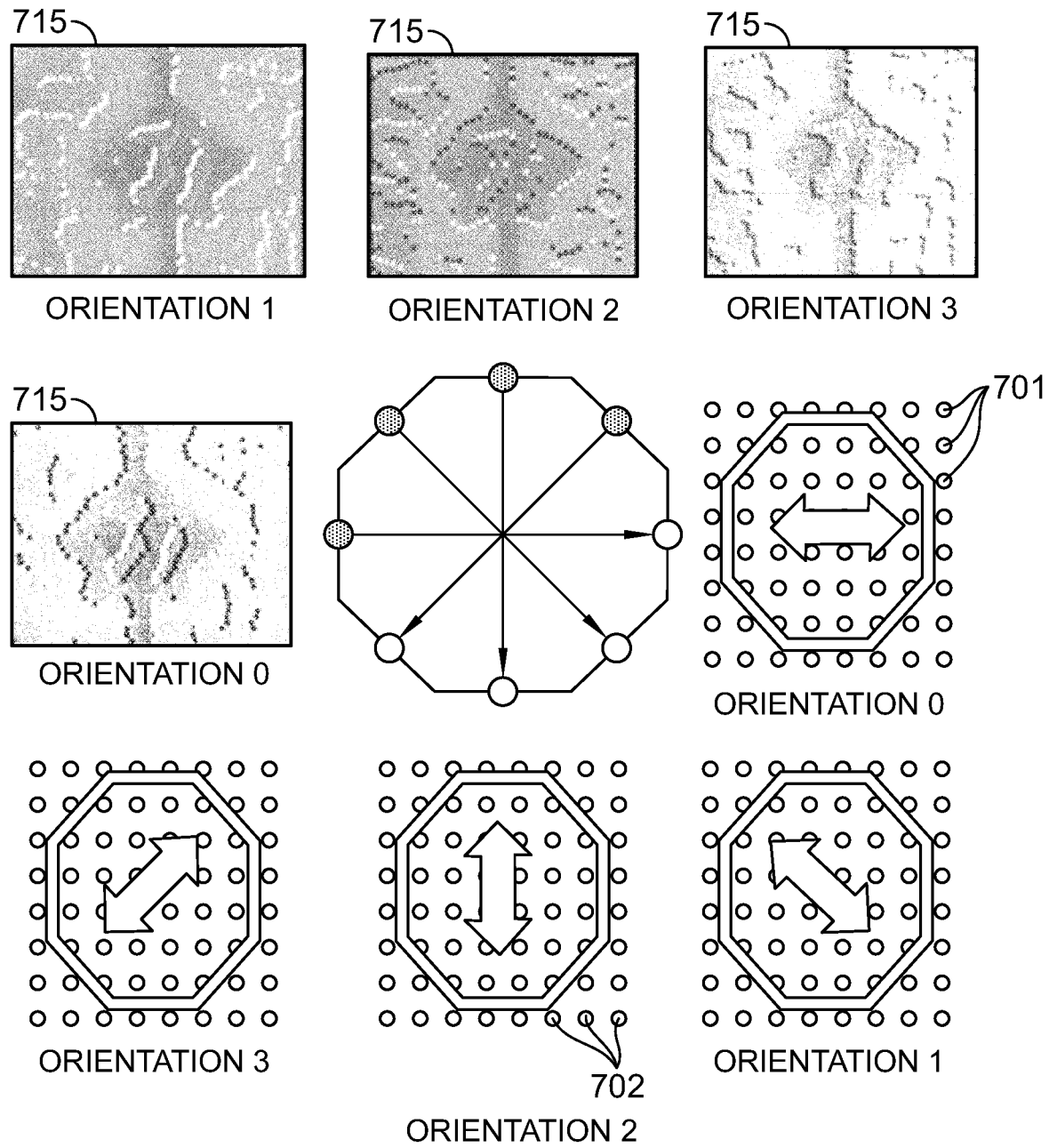
FIG. 7 is an exemplary orientation map provided in accordance with at least one embodiment.

As illustrated in FIG. 7, the blob image 715 may be electronically vibrated along any number of orientations during OMT. For example, in the case of four orientations: a horizontal orientation 0 (left/right), a diagonal orientation 1 (upper-left/lower-right), vertical 2 (up/down), and orientation 3 (upper-right/lower-left). For orientation 0, the horizontal lines 701 represent the rows of the image and the vertical lines 702 represent the columns of the image. For each orientation angle, the vibration can be used to compute the roots (zero-crossings) of the blob image by forming a bi-linear interpolation based on a point in the blob image with a pixel boundary intersection above zero and one below zero. Preferably, the blob image is vibrated along the horizontal orientation 0 in order to identify roots corresponding to vertical contours in the blob image and vertical orientation 2 in order to identify roots corresponding to horizontal contours in the blob image.

Figure 8:
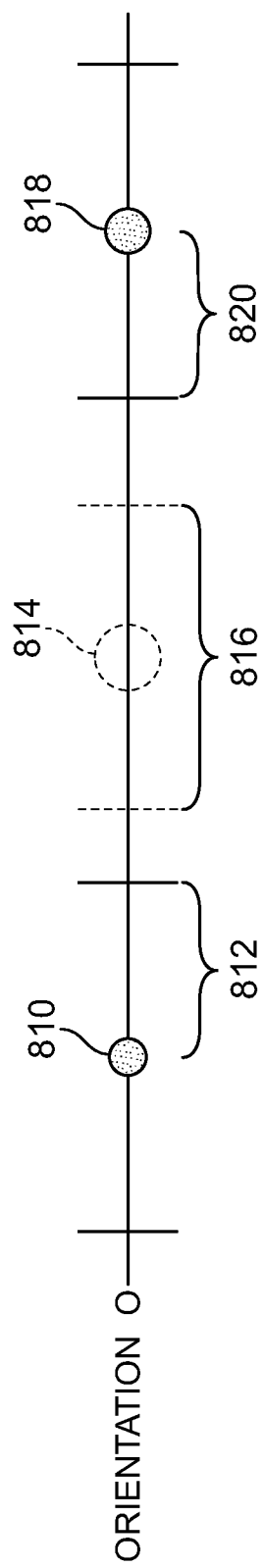
FIG. 8 is an exemplary diagram of root processing along an orientation and associated dead zone spacing along the orientation.

This particular image filtering and root filtering greatly reduces confusion in associating roots over successive image frames of data, by reducing the amount of data by a factor of four in frame-to-frame analysis. Root association requires there be roots in each frame, and therefore, their associated dead zones must also be in each frame. These required dead zones create a relatively large spacing between roots along an orientation and thereby make it easier to identify and associate the same root along multiple frames. Further processing to associate the roots includes first separating the roots based on whether they correspond to the horizontal orientation 0 or vertical orientation 2 and select an orientation for association. Next, roots, already separated by dead zones of 8 pixel subunits, in that orientation are separated into positive and negative roots. As exemplified in FIG. 5, positive and negative roots alternate along an orientation as the intensity profile must alternate from negative to positive and then back from positive to negative in order to create a zero crossing again. Only positive roots may be associated with positive roots and vice versa. In this manner, the separated roots along this orientation may now be separated by their dead zone as well as the deadzone of the non-associated root. For Example, in FIG. 8 showing roots along orientation 0, a positive root 810 may now have a guaranteed spacing with no roots in it of at least its own dead zone 812, of 8 subpixel units, at least 16 subpixel units of dead zone 816 surround the filtered out negative root 814, and the 8 subpixel units of dead zone 820 of the next positive root 818 in that orientation. The roots of a single polarity along an orientation may therefore have at least 32 subpixel units, or 4 pixels spacing between adjacent roots, making it possible to match roots over time with less likelihood of confusion between adjacent image frames.

1D root association across multiple successive image frames of scene data in time along orientation zero may result in a determination of horizontal velocity of that root as vx=2. Similarly, in orientation 2, a 1D root association may be applied across multiple frames and the vertical velocity of the object may be determined as vy=1.

The final velocity may be computed by combining the velocities of the space-time skews and computed velocities. For example, the 1D velocity for the vertical space-time skew (vx=0, vy=1) may be combined with the 1D velocity associated for orientation 0 (vx=2, vy=0) to give a final 2D velocity of (vx=2, vy=1).

Additionally, 1D and 2D linking of roots may be achieved through various filters and rules to form edges of moving objects in the scene as described in described in detail in U.S. Ser. No. 15/619,992, entitled SYSTEM AND METHOD FOR ROOT ASSOCIATION IN IMAGE DATA filed Jun. 12, 2017, incorporated by reference in its entirety.

APPENDIX A

```
for each column in blob image{
    for each row in blob image {
        aa = blob_image[column, row]
        bb = blob_image[column+1, row]
        cc = blob_image[column, row+1]
        vv_0 = 0
        // orientation 0
        if ((aa < 0) && (bb > 0) { // positive root
            dif = aa − bb ;
            sub_pixel_offset = integer(aa/dif*8)
        }
        else if ((aa > 0) && (bb < 0)) { // negative root
            dif = aa − bb
            sub_pixel_offset = integer(aa/dif*8)
        }
        // orientation 2
        if ((aa < 0) && (cc > 0) { // positive root
            dif = aa − cc;
            sub_pixel_offset = integer(aa/dif`8)
        }
        else if ((aa > 0) && (cc < 0)) { // negative root
            dif = aa − cc
            sub_pixel_offset = integer(aa/dif*8)
        }
    }
}
```

The invention claimed is:

1. A neuromorphic vision system for generating and processing video image data within a field of view, the system comprising:
    an image sensor comprising a plurality of photoreceptors each corresponding to an image data pixel and generating video image data corresponding to the field of view and each indicating an intensity value measured by the photoreceptor of the corresponding image data pixel;
    an image filter in communication with the image sensor to receive the video image data from the image sensor, the image filter generating intensity data based on the video image data received from the image sensor; and
    a means for identifying roots corresponding to the field of view based on the intensity data, the means for identifying roots being arranged in communication with the image filter to receive the intensity data and configured to identify the roots to sub-pixel accuracy based on the intensity data,
    wherein roots are identified over time based on a minimum spacing existing between adjacent roots in which no other roots can be located,
    wherein the identified roots over time are used to associate roots to generate root velocities, whereby roots having the same velocity are associated with one another, and
    wherein the associated roots form at least one contour of an object in the field of view.

2. The neuromorphic vision system of claim 1, wherein each root is a zero-crossing having one of positive or negative polarity and lying on one of a number of predefined intervals along a first dimension in a two-dimensional, Cartesian coordinate system.

3. The neuromorphic vision system of claim 1, wherein the means for generating roots outputs the roots to one or more link filters, which link a plurality of roots to define the at least one contour of the object in the field of view.

4. The neuromorphic vision system of claim 1, wherein the roots are spaced apart by at least one pixel width.

5. The neuromorphic vision system of claim 1, wherein a size of the image sensor generated image data is the same as a size of the intensity data generated by the image filter.

6. The neuromorphic vision system of claim 5, wherein the image sensor generated image data and the image filter generated intensity data are 2048 pixels by 2048 pixels.

7. The neuromorphic vision system of claim 1, wherein the means for generating roots is a root filter that extracts roots from intensity data by computing zero-crossings of the intensity data along at least one orientation angle.

8. The neuromorphic vision system of claim 7, wherein the at least one orientation angle is a horizontal axis, and the zero-crossings are computed using bilinear interpolation.

9. The neuromorphic vision system of claim 7, wherein the at least one orientation is a vertical axis, and the zero-crossings are computed using bilinear interpolation.

10. A neuromorphic vision method for generating and processing video image data within a field of view, the system comprising:
   generating video image data corresponding to the field of view comprising a plurality of photoreceptors of the corresponding image data and each indicating an intensity value measured by an image sensor;
   generating intensity data based on the video image data received from the image sensor using an image filter in communication with the image sensor;
   receiving the intensity data and identifying roots to sub-pixel accuracy based on the intensity data corresponding to the field of view using a means for identifying roots, the means for identifying roots being arranged in communication with the image filter; and
   linking a number of roots to form at least one boundary corresponding to an object in the field of view;
   wherein the roots are identified over time based on a minimum spacing existing between adjacent roots in which no other roots can be located,
   wherein the identified roots over time are used to associate roots to generate root velocities, whereby roots having the same velocity are associated with one another, and
   wherein the associated roots form at least one contour of an object in the field of view.

11. The method of claim 10, wherein each root is defined as a zero-crossing having one of positive or negative polarity and lying on one of a number of predefined intervals along a first dimension in a two-dimensional, Cartesian coordinate system.

12. An automated vehicle system for providing partially or fully automated operation, the system comprising:
   chassis adapted for driven motion by a power source:
   a navigation control system adapted to guide a course of motion of chassis; and
   a neuromorphic vision system for generating and processing image data within a field of view including an image sensor comprising a plurality of photoreceptors each corresponding to an image data pixel and generating video image data corresponding to the field of view and each indicating an intensity value measured by the photoreceptor of the corresponding image data pixel, an image filter in communication with the image sensor to receive the video image data from the image sensor, the image filter generating intensity data based on the video image data received from the image sensor, and a means for identifying roots corresponding to the field of view based on the intensity data, the means for identifying roots being arranged in communication with the image filter to receive the intensity data and configured to identify the roots to sub-pixel accuracy based on the intensity data,
   wherein roots are identified over time based on a minimum spacing existing between adjacent roots in which no other roots can be located,
   wherein the identified roots over time are used to associate roots to generate root velocities, whereby roots having the same velocity are associated with one another,
   wherein the associated roots form at least one contour of an object in the field of view, and
   wherein the neuromorphic vision system is in communication with the navigational control system to communicate the root association for consideration in guiding vehicle motion.

13. The automated vehicle system of claim 12, wherein the root association comprises linking roots across successively captured image data frames and the neuromorphic system communicates a velocity of the roots.

14. The automated vehicle system of claim 12, wherein the root association comprises linking a plurality of roots to define at least one contour of an object in the field of view.

15. A neuromorphic vision system for generating and processing video image data within a field of view, the system comprising:
   an image sensor comprising a plurality of photoreceptors each corresponding to an image data pixel and generating video image data corresponding to the field of view and each indicating an intensity value measured by the photoreceptor of the corresponding image data pixel,
   an image filter in communication with the image sensor to receive the video image data from the image sensor, the image filter generating intensity data based on the video image data received from the image sensor; and
   software running on a processor for generating roots corresponding to the field of view based on the intensity, the software analyzes the intensity data to identify the roots to sub-pixel accuracy based on the intensity,
   wherein roots are identified over time based on a minimum spacing existing between adjacent roots in which no other roots can be located,
   wherein the identified roots over time are used to associate roots to generate root velocities, whereby roots having the same velocity are associated with one another, and
   wherein the associated roots form at least one contour of an object in the field of view.

16. The neuromorphic vision system of claim 15, wherein each root is a zero-crossing having one of positive or negative polarity and lying on one of a number of predefined intervals along a first dimension in a two-dimensional, Cartesian coordinate system.

17. The neuromorphic vision system of claim 15, wherein the software is further configured to link a plurality of roots to define the at least one contour of the object in the field of view.

18. The neuromorphic vision system of claim 15, wherein the roots are spaced apart by at least one pixel width.

19. The neuromorphic vision system of claim 15, wherein a size of the image sensor generated image data is the same as a size of the intensity data generated by the image filter.

20. The neuromorphic vision system of claim 19, wherein the image sensor generated image data and the image filter generated intensity data are 2048 pixels by 2048 pixels.

21. The neuromorphic vision system of claim 15, wherein the software is configured to extracts roots from intensity data by computing zero-crossings of the intensity data along at least one orientation angle.

22. The neuromorphic vision system of claim 15, wherein the at least one orientation angle is a horizontal axis, and the zero-crossings are computed using bilinear interpolation.

23. The neuromorphic vision system of claim 15 wherein the at least one orientation is a vertical axis, and the zero-crossings are computed using bilinear interpolation.

\* \* \* \* \*